3,035,038
CHLORINATION OF POLYETHYLENES HAVING A DENSITY OF MORE THAN 0.93
Friedrich Nolte, Stadtbergen, near Augsburg, Helmut Klug, Gersthofen, near Augsburg, and Ludwig Orthner and Horst Herzberg, Frankfurt am Main, Germany, assignors to Farbwerke Hoechst Aktiengesellschaft vormals Meister Lucius and Brüning, Frankfurt am Main, Germany, a corporation of Germany
No Drawing. Filed May 13, 1958, Ser. No. 734,859
10 Claims. (Cl. 260—94.9)

The present invention relates to the chlorination of polyethylenes having a density of more than 0.93.

It has already been proposed to chlorinate polyethylenes having a density of at least 0.93, especially low pressure polyethlenes having a density of between 0.93 and 0.95, and more particularly those obtained with the use of organo-metal compounds with addition of reducible heavy metal compounds, in the presence of either water or a solvent. Chlorination in solution yields uniform and especially interesting products.

Chlorination in solution must be carried out at a raised temperature due to the poor solubility of polyethylenes having a density of more than 0.93, and necessitates a closed vessel if it is carried out in the presence of a low-boiling solvent. This gives rise to the formation of relatively high pressures in view of the fact that the pressure of the gaseous hydrogen chloride which is insoluble in the solvent and set free during the chlorination, is added to the vapor pressure of the solvent. The formation of high pressure, however, requires the use of expensive special design apparatus.

Now we have found that the reaction pressure produced in chlorinating polyethylene with a density of more than 0.93 which distinguishes over those of a lower density by a better linearity and crystallinity, at a raised temperature in the presence of a solvent can be considerably reduced by carrying out the chlorination in the presence of water and a solvent. In this chlorination process the hydrogen chloride dissolves in water so that the pressure of this gas is practically suppressed.

In carrying out the chlorination it is advantageous to use solid, preferably pulverulent polyethylene having a density of more than 0.93, for example low pressure polyethylene, which is suspended in water by intensive mechanic agitation; a solvent is then added and the chlorination is carried out at a raised temperature.

The low pressure polyethylenes used have a density of more than 0.93 and a molecular weight of at least 12,000, or more especially a molecular weight within the range of 20,000 and 2,000,000, preferably within the range of 60,000 and 200,000. Polyethylenes having a molecular weight lower than indicated above may, however, also be used under special circumstances. It is especially suitable to use low pressure polyethylenes with a density of between 0.93 and 0.95. These low pressure polyethylenes differ from high pressure polyethylenes in that they possess a higher density, a better linearity and a higher crystallinity (cf. R. A. V. Raff and I. B. Allison, "Polyethylene," Interscience Publishers, New York, London, 1956, pages 16–17; Chemical Week, 1955, June 4, page 58).

The chlorination is advantageously carried out in the presence of three to thirty times the amount of water, calculated upon the polyethylene used, which may also contain an electrolyte such as an acid and/or a salt (for example calcium chloride, sodium chloride or sodium sulfate) if desired with addition of a catalyst and an emulsifier. As catalysts there may be used, inter alia, peroxides, such as benzoyl peroxide, toluyl peroxide, chlorobenzoyl peroxide, lauroyl peroxide, or cyclohexanone peroxide; as catalysts there may also be used azonitriles, for example azodiisobutyronitrile. The chlorination can be accelerated by the action of short wave light or another active source of radiation. Suitable emulsifiers are, for example, alkylarylsulfonates or alkylsulfonates.

As solvents suitable for use in this invention there may be employed all substances which dissolve polyethylenes having a density of at least 0.93 and practically do not react with chlorine gas under the reaction conditions, for example, carbon tetrachloride, chloroform, methylene chloride, nitrobenzene or a similar compound, in which the chlorine atoms are wholly or partially replaced by other halogen atoms. It is advantageous to carry out the chlorination in the presence of at least such an amount of solvent that after chlorination, namely after the desired degree of chlorination has been achieved, the chlorinated low pressure polyethylene is obtained substantially in the dissolved state. Furthermore, it is advantageous to take care by intensive mechanic agitation during the reaction that the contents of the vessel are fairly thoroughly mixed.

The chlorination can be carried out at atmospheric pressure if the solvent used has a relatively high boiling point and if a salt solution, for example a 20% calcium chloride solution or a 15% sodium chloride solution is substituted for water. It is, however, preferred to carry out the chlorination under superatmospheric pressure as the reaction velocity and solubility of the starting material and the chlorinated product are greater at a higher temperature. Chlorination under superatmospheric pressure is especially advantageous when low boiling solvents are used. The preferred pressures are within the range of 1.5 and 7 atmospheres absolute, and the preferred temperature range is within 100 and 150° C.

In the manner described it is possible to produce without difficulty chlorinated low pressure polyethylenes containing up to 75% by weight of chlorine.

The process of this invention involves the advantage that it can be carried out under a low reaction pressure and in addition thereto, it enables the chlorine content of polyethylene to be very rapidly and accurately measured by determining the hydrochloric acid-content of the water by titration. This determination is especially interesting, if it is desired to produce a substance with a limited content of chlorine. In a chlorination carried out without the addition of water, it takes hours to determine the chlorine content, while minutes will do in this invention.

The chlorinated low pressure polyethylenes produced by this invention are used, depending on the amount of chlorine incorporated, as raw materials for making lacquers and films, and they may be used alone or in conjunction with other high polymers for the manufacture of difficultly inflammable substances, and in a variety of other fields of application.

It has unexpectedly been ascertained that the outstanding properties of polyvinyl chloride are still further improved by the incorporation of a polyethylene which has been chlorinated in solution. The thermostability of elastified polyvinyl chloride, for example is still further increased by incorporating therewith a low pressure polyethylene chlorinated by the process of this invention.

The following examples serve to illustrate the invention, but they are not intended to limit it thereto, the parts being by weight unless otherwise stated:

*Example 1*

10 parts of low pressure polyethylene having a molecular weight of about 60,000 were suspended in 100 parts of water and 500 parts of carbon tetrachloride.

The suspension was then heated to boiling at atmospheric pressure to expel the air. The vessel was closed and heated under superatmospheric pressure to about 110° C. About 14.8 parts of chlorine were then introduced within 30 minutes.

A solution or suspension of a chlorinated polyethylene was obtained which contained about 42% by weight of chemically bound chlorine. It could be further processed (if desired after neutralisation) without an isolation of the chlorinated polyethylene having been necessary.

*Example 2*

20 parts of low pressure polyethylene having a molecular weight of about 70,000 were suspended in 150 parts of water and 900 parts of chloroform.

The suspension was heated to boiling at atmospheric pressure to expel the air. The vessel was closed and heated to about 115° C. under superatmospheric pressure. 40 parts of chlorine were then introduced within 30 minutes.

A solution of a chlorinated polyethylene was obtained, which contained about 50% by weight of chemically bound chlorine.

*Example 3*

15 parts of a polyethylene having a density of 0.945 and a molecular weight of about 90,000 were suspended in 200 parts of water and 800 parts of chloroform.

0.05 part of azo-di-iso-butyronitrile (or 0.1 part of benzoyl peroxide) was added as a catalyst, and 0.6 part of the sodium salt of alkylbenzenesulfonic acid was added as an emulsifier.

The mixture was heated to boiling at atmospheric pressure to expel the air. The vessel was closed and heated to about 125° C. under superatmospheric pressure. About 12 parts of chlorine were then introduced within 30 minutes.

A solution of chlorinated polyethylene was obtained, which contained about 29% of chemically bound chlorine.

*Example 4*

20 parts of polyethylene having a molecular weight of about 150,000 were suspended in 500 parts of a 20% calcium chloride solution and 1000 parts of carbon tetrachloride.

The suspension was heated to boiling at atmospheric pressure to expel the air. The vessel was closed and heated to about 140° C. under superatmospheric pressure. 110 parts of chlorine were then introduced within 2 hours under the action ultra-violet light.

A solution of chlorinated polyethylene was obtained, which contained about 75% of chemically bound chlorine.

We claim:

1. In a process for the chlorination of low pressure polyethylene having a density of more than 0.93 and a molecular weight of at least 12,000 by contacting said low pressure polyethylene with a chlorinating agent in a solvent for chlorinated polyethylene, said process requiring a chlorination temperature of 100–150° C. due to the insolubility of low pressure polyethylene at lower temperatures, this giving rise to the formation of high pressures to maintain the solvent in liquid form and to suppress the gaseous hydrogen chloride formed during chlorination, the improvement comprising chlorinating said polyethylene at a temperature of 100–150° C., in a mixture of a 3 to 30 fold amount, calculated on the polyethylene, of water and an amount of an organic solvent for chlorinated polyethylene sufficient to substantially dissolve the chlorinated polyethylene obtained, the gaseous hydrogen chloride formed during the chlorination being dissolved in the aqueous phase so that its vapor pressure is suppressed and the reaction pressure can be reduced accordingly, and recovering a solution of chlorinated low pressure polyethylene in the organic phase of the reaction medium.

2. Process of claim 1 wherein said low pressure polyethylene has a molecular weight of 20,000 to 2,000,000.

3. Process of claim 1 wherein chlorination is conducted in a mixture of water and a carbon tetrachloride solvent.

4. Process of claim 1 wherein chlorination is effected at temperatures of 100–150° C.

5. Process of claim 1 wherein the chlorination pressure ranges from 1.5 to 7 atmospheres absolute.

6. Process of claim 1 wherein the chlorination is conducted in the presence of a catalyst.

7. Process of claim 1 wherein the chlorination is conducted in the presence of an emulsifier.

8. Process of claim 1 wherein the chlorination is conducted in the presence of an electrolyte.

9. Process of claim 1 wherein the chlorination is conducted in the presence of a water-soluble emulsifier so that the chlorinated polyethylene which is obtained in the dissolved state in the organic solvent is free from absorbed emulsifier.

10. In a process for the chlorination of low pressure polyethylene having a density of more than 0.93 and a molecular weight of at least 12,000 by contacting said low pressure polyethylene with a chlorinating agent in a solvent for chlorinated polyethylene, said process requiring a chlorination temperature of 100–150° C. due to the insolubility of low pressure polyethylene at lower temperatures, this giving rise to the formation of high pressures to maintain the solvent in liquid form and to suppress the gaseous hydrogen chloride formed during chlorination, the improvement comprising chlorinating said polyethylene at a temperature of 100–150° C. in a mixture of a 3 to 30 fold amount, calculated on the polyethylene, of water and an amount of an organic solvent for chlorinated polyethylene sufficient to substantially dissolve the chlorinated polyethylene obtained, the gaseous hydrogen chloride formed during the chlorination being dissolved in the aqueous phase so that its vapor pressure is suppressed and the reaction pressure can be reduced accordingly, terminating the chlorination as soon as the hydrogen chloride content of the water has reached an amount corresponding to the desired degree of chlorination of the polyethylene, and recovering a solution of chlorinated low pressure polyethylene in the organic phase of the reaction medium.

References Cited in the file of this patent

UNITED STATES PATENTS

| | | |
|---|---|---|
| 2,503,252 | Ernsberger | Apr. 11, 1950 |
| 2,592,763 | Taylor | Apr. 15, 1952 |
| 2,695,899 | Becker et al. | Nov. 30, 1954 |
| 2,829,136 | Fotis et al. | Apr. 1, 1958 |
| 2,906,743 | Heitzer | Sept. 29, 1959 |

OTHER REFERENCES

"Polythene," by Renfrew et al., Iliffe & Sons, London 1957. Pages 267–271.

"Polyethylene" by Raff et al., Interscience Publishers, Inc., New York 1956. Pages 133–135.